United States Patent [19]

Komiya

[11] 4,200,563

[45] Apr. 29, 1980

[54] METHOD OF PRODUCING AQUEOUS POLYMER EMULSION WITH IMPROVED STABILITY

[75] Inventor: Shigeo Komiya, Okayama, Japan

[73] Assignee: Japan Exlan Company Limited, Osaka, Japan

[21] Appl. No.: 892,408

[22] Filed: Mar. 29, 1978

[30] Foreign Application Priority Data

Apr. 12, 1977 [JP] Japan .................................. 52-42204

[51] Int. Cl.² ............................................. C08L 33/14
[52] U.S. Cl. ........................ 260/29.6 SQ; 260/29.6 H; 526/287; 526/320
[58] Field of Search ................. 526/320; 260/29.6 H, 260/29.6 TA, 29.6 SQ, 29.6 RW, 29.6 WB, 29.7 H

[56] References Cited

U.S. PATENT DOCUMENTS

| | | | |
|---|---|---|---|
| 3,719,647 | 3/1973 | Hardy | 526/320 |
| 4,028,295 | 6/1977 | Loshaek | 526/320 |
| 4,038,264 | 7/1977 | Rostoker | 526/320 |

*Primary Examiner*—Paul R. Michl
*Attorney, Agent, or Firm*—Wenderoth, Lind & Ponack

[57] ABSTRACT

In producing an aqueous emulsion containing substantially no emulsifier, an aqueous polymer emulsion remarkably elevated in chemical stability is obtained by copolymerizing a specific amount of a particular vinyl monomer containing polyoxyethylene units as an indispensable copolymerization component.

4 Claims, No Drawings

METHOD OF PRODUCING AQUEOUS POLYMER EMULSION WITH IMPROVED STABILITY

BACKGROUND OF THE INVENTION

1. Field of the Invention

The present invention relates to a method of producing an aqueous polymer emulsion having excellent stability. More specifically, the present invention is intended for producing an aqueous emulsion containing substantially no emulsifier and relates to a method of producing an aqueous polymer emulsion remarkably elevated in chemical stability by copolymerizing a specific amount of a particular vinyl monomer containing polyoxyethylene units as an indispensable copolymerization component.

2. Description of the Prior Art

In order to maintain the stability of aqueous polymer emulsions, it has been generally the practice heretofore in producing such emulsions to add a low molecular weight emulsifier upon polymerization or to compound a low molecular weight emulsifier or dispersant after polymerization. In recent years, there is an increasing demand in using aqueous polymer emulsions for paints, cement or mortar mixing, adhesives, textile treatment and paper processing. For such applications, the emulsion in intact form is usually used and not the polymer itself removed from the emulsion. Accordingly, when the emulsion contains an emulsifier or dispersant, foaming of the emulsion will occur on account of the emulsifier, etc. contained, and this makes it handling upon processing extremely difficult. Of course, the addition of a defoaming agent is attempted to prevent foaming, but when such an emulsion containing a defoaming agent is used for the above-mentioned purposes such as paint or cement, the mechanical strength or moisture-proofing of the film or shaped product will be seriously lowered by the secondary action of the emulsifier or defoaming agent, and this will constitute a great hindrance in practical use.

In order to obviate the defects attendant on such emulsifier-containing emulsions, aqueous emulsions free from low molecular weight emulsifiers have been noted in recent years, and many researches are being made of such emulsifier-free aqueous polymer emulsions or methods for producing the same.

The emulsifier-free aqueous polymer emulsions have various excellent features in comparison with the conventional emulsifier-containing emulsions. But on the other side, they involve a defect such that they are remarkably low in chemical stability, particularly in the stability against electrolytes, in comparison with the usual emulsifier-containing emulsions, and easily precipitate or coagulate by the addition of a small amount of electrolytes. Such defects present various problems and pose difficulties in practical use for applications wherein large amounts of electrolytes and other substances are mixed, as in paints, cement or mortar mixing, adhesives, paper processing and textile treatment.

To improve the chemical stability of emulsifier-free aqueous emulsions, a method is proposed in Japanese KOKAI Pat. No. 51-30284 wherein a monomer represented by the following general formula is copolymerized as a copolymerization component:

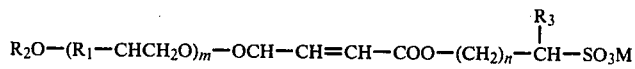

wherein $R_1$ is H or an alkyl group of $C_1$ to $C_4$; $R_2$ is H or an alkyl group of $C_1$ to $C_{22}$; $5 \leq m \leq 150$; $R_3$ is H in which case $n=1$ to 3 or $R_3$ is a methyl group in which case $n=2$; M is a monovalent cation such as an alkali metal or ammonium base. When such a monomer is used, the chemical stability will be improved to some extent, but it is not good enough. Moreover, because the monomer is extremely low in radical polymerization activity, the polymerization reaction requires a long time and the reaction ratio is low. On account of these disadvantages, this method is difficult to be employed on a practical basis. In addition, it is a defect that the process for producing said monomer is complicated.

STATEMENT OF THE INVENTION

In the light of such a situation, we researched to obviate the above-mentioned defects which the emulsifier-free emulsions have. As a result, we have found that, in producing aqueous polymer emulsions, when a particular vinyl monomer containing polyoxyethylene units is copolymerized as an indispensable copolymerization component, the chemical stability, particularly the stability against electrolytes, of the resulting aqueous polymer emulsion is greatly elevated. The present invention is based on this discovery.

A main object of the present invention is to propose a method of advantageously obtaining an emulsifier-free aqueous polymer emulsion having an excellent chemical stability which has not been easily attained by the conventional emulsifier- or dispersant-free aqueous emulsions.

Another main object of the present invention is to provide an aqueous polymer emulsion remarkably improved in its properties for use in paints, cement or mortar mixing, film formation, adhesives, textile treatment and paper processing.

A still further object of the present invention is to provide an aqueous polymer emulsion having fine particle diameters and possessing mechanical stability and freeze stability.

Other objects of the present invention will become apparent from the following concrete explanation of the invention.

Such objects of the present invention are attained, upon producing an emulsifier-free aqueous polymer emulsion, by copolymerizing in an aqueous medium a monomer mixture consisting of a polyoxyethylene units-containing vinyl monomer (A) represented by the following formula (I) which forms 0.01 to 30 weight % of the total monomer mixture:

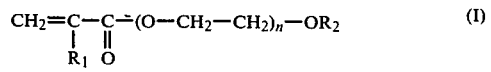

wherein $R_1$ is H or $CH_3$; $R_2$ is H, $CH_3$ or $C_6H_4$—$(CH_2)_m$—H; n is an integer of from 4 to 30; and m is an integer of from 0 to 20, and one or more different radical-polymerizable vinyl monomers (B) which form the remainder.

The aqueous polymer emulsion obtained by the method of the present invention has very good chemical stability although it contains no emulsifier or other additives. Accordingly, in the case where the aqueous polymer emulsion is applied to a production process in which it is mixed with a large amount of an electrolyte, as in the case of paint production or cement or mortar kneading, the use of the aqueous polymer emulsion will produce a good mixing effect without causing any precipitation or coagulation.

The aqueous polymer emulsion obtained in accordance with the method of the present invention is remarkably improved in its chemical stability without particularly adding any additive, for example polyvinyl alcohol, low molecular weight anionic surface-active agent or the like. Furthermore, the aqueous polymer emulsion according to the present invention makes the use of a defoaming agent unnecessary because it represents substantially no foaming. Therefore, when the emulsion is used for film formation for example, it does not undergo any adverse effect due to subsidiary materials such as additives, defoaming agents or the like, and the resistance to exfoliation, the resistance to water and the physical properties such as strength of the resulting film are not impaired at all.

In addition, the aqueous polymer emulsion according to the present invention is superior to the conventional emulsifier-free aqueous polymer emulsions in mechanical stability and freeze stability.

Thus, since the aqueous polymer emulsion according to the present invention has various merits, it can be used not only for film formation, adhesives, textile treatment and paper processing but also especially for paints and cement and mortar mixing, and therefore its industrial value is very important.

DESCRIPTION OF PREFERRED EMBODIMENTS

An important matter in producing the emulsifier-free aqueous polymer emulsion of the present invention is that the amount of use of the monomer represented by the general formula (I) should be within the range of 0.01 to 30 weight % based on the total monomer mixture to be copolymerized. When the amount of use is less than 0.01 weight %, the chemical stability, the attainment of which is an object of the present invention, cannot be obtained, and on the other hand when it exceeds 30 weight %, the physical properties of the film formed from the emulsion, especially the mechanical strength and water resistance, will seriously lowered, and the film cannot be submitted to practical use. In order to bring the chemical stability of the emulsion and the physical properties of the film produced therefrom within a more preferred range in practical use, it is preferable to maintain the amount of use of the monomer represented by the general formula (I) within the range of from 0.5 to 10 weight %.

As used in this specification the term emulsifier-free aqueous polymer emulsion means those produced without addition of any low molecular weight emulsifier before, during or after polymerization.

As preferred methods of producing the aqueous polymer emulsion of the present invention, there may be mentioned methods in which a monomer mixture consisting of a vinyl monomer containing polyoxyethylene units, a vinyl monomer containing a sulfonic acid group and other vinyl monomers are copolymerized in the presence or absence of a specific water-soluble polymer; or methods in which a vinyl monomer containing polyoxyethylene units and other vinyl monomers are copolymerized in the presence of a specific water-soluble polymer. Representative of such methods is a method in which a monomer mixture composed of a vinyl monomer (A) represented by the above-mentioned general formula (I) and a monomer group (vinyl monomers (B)) consisting of a vinyl monomer or vinyl monomers containing sulfonic acid or a salt thereof as represented by the following general formula (II) and/or the following general formula (III):

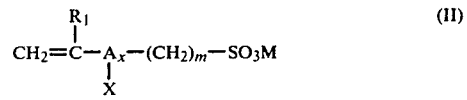

wherein $R_1$ is H or $CH_3$; A is a benzene ring; X is H or an alkyl group of $C_1$–$C_4$; M is H, $NH_4$ or an alkali metal atom; x is 0 or 1 and m is an integer of from 0 to 4,

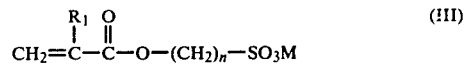

wherein $R_1$ is H or $CH_3$; M is H, $NH_4$ or an alkali metal atom; and n is an integer of from 1 to 4, and at least one different copolymerizable vinyl monomer, is copolymerized without using any low molecular weight emulsifier in the presence or absence of a specific water-soluble polymer by the usual radical polymerization technique, or a method wherein a vinyl monomer represented by the above-mentioned general formula (I) and at least one different copolymerizable monomer are copolymerized in the presence of a specific water-soluble polymer by the usual radical polymerization technique.

The vinyl monomers represented by the general formula (I) are acrylic acid esters or methacrylic acid esters containing combined thereto polyoxyethylene units. For example, there may be mentioned polyethylene glycol monoacrylate or methacrylate, methoxypolyethylene glycol monoacrylate or methacrylate, and alkyl substituted phenoxypolyethylene glycol monoacrylate or methacrylate such as polyethylene glycol (9 mol) mono(meth)acrylate, polyethylene glycol (23 mol) mono(meth)acrylate, methoxypolyethylene glycol (9 mol) mono (meth)acrylate, methoxypolyethylene glycol (23 mol) mono (meth)acrylate, polyethylene glycol (30 mol) mono(meth)acrylate, and phenoxypolyethylene glycol (30 mol) mono(meth)acrylate.

Among the vinyl monomers containing sulfonic acid or a salt thereof represented by the general formula (II), there may be mentioned unsaturated hydrocarbonsulfonic acids, for example vinylsulfonic acid, allysulfonic acid, methallylsulfonic acid, para-styrenesulfonic acid and their alkali metal salts or ammonium salts; and among the vinyl monomers represented by the general formula (III), there may be mentioned acrylic or methacrylic acid sulfoalkyl esters, for example sulfobutyl acrylate, sulfoethyl acrylate, sulfopropyl methacrylate and their alkali metal salts and ammonium salts.

In this connection, we refer to the ratio of use of the vinyl monomers represented by the general formula (II) or (III). Namely, when the copolymerization is carried out in the absence of a specific water-soluble polymer, the amount of use of these monomers is desirably maintained within the range of from 0.1 to 15 weight % based on the total amount of the whole monomer mixture, and when the copolymerization is carried out in the presence of a specific water-soluble polymer, these may be used or may be dispensed with, but if used the amount is desirably adjusted to below 15 weight % based on the total amount of the whole monomer mixture.

The above-mentioned specific water-soluble polymers are those prepared to contain, as the polymer-forming units, in combination, monomer units (C component) composed of an ethylenically unsaturated carboxylic acid or a salt thereof and monomer units (D component) composed of an ethylenically unsaturated sulfonic acid or a salt thereof, so as to be water-soluble. These polymers can be effectively used for the present invention so long as they are water-soluble polymers finally containing both (C) and (D) components even if they are obtained by any method, but generally they can be produced by copolymerizing the (C) component and (D) component by a suitable known method.

Among the (C) components to be introduced into the water-soluble polymer, there may be mentioned unsaturated monovalent carboxylic acids such as acrylic acid, methacrylic acid and salts thereof; and unsaturated polyvalent carboxylic acids such as maleic acid, fumaric acid, itaconic acid and salts thereof. Among the (D) components, there may be mentioned sulfonated unsaturated hydrocarbons such as sulfonated styrene, allysulfonic acid, methallylsulfonic acid and salts thereof; and acrylic or methacrylic acid sulfoalkyl esters such as sulfoethyl methacrylate, sulfopropyl methacrylate, and salts thereof.

Also, as said specific water-soluble polymers, it is possible to use known vinyl alcohol derivatives. The term vinyl alcohol derivatives used herein is a generic term for vinyl alcohol derivatives containing a sulfonic acid group or sulfuric acid group, such as those obtained by saponifying copolymers copolymerized with, for example, vinylsulfonic acid, allysulfonic acid, methallylsulfonic acid, styrenesulfonic acid, sulfopropyl methacrylate, para-styrenesulfonic acid or the like, or a salt thereof and vinyl acetate, in an alkaline or acid solution containing methyl alcohol; those obtained by treating polyvinyl alcohol with bromine, iodine, etc., and then treating it with acid sodium sulfite; and polymers obtained by heating polyvinyl alcohol in a concentrated aqueous solution of sulfuric acid.

The copolymerization of the vinyl monomer mixture in the present invention is carried out under the same condition as in the conventional emulsion polymerization, except that a low molecular weight emulsifier is not added. Namely, when the monomer mixture to be copolymerized is used together with an aqueous solution of a prescribed amount of a water-soluble catalyst and a specific water-soluble polymer, 0.5 to 10 weight % of the above-mentioned water-soluble polymer based on the total weight of the monomer mixture and an aqueous solution of a prescribed amount of a water-soluble catalyst are supplied to the polymerization system, and after adding a chain transfer agent if necessary, the polymerization is carried out at a prescribed temperature. As the polymerization methods, either batch polymerization or continuous polymerization may be used. In the batch polymerization method, the way of supplying the aqueous solution containing the monomer mixture, catalyst, etc. include "in-one-lump" charging method, "by-portions" adding method, continuous adding method, etc., and any method may be employed. However, to exhibit the effect of the present invention fully, the continuous adding method is most preferred.

Other vinyl monomers except the monomer represented by the general formulae (I) and (II) and/or (III) which are applied to such polymerization include conjugated diene monomers such as butadiene, isoprene, etc.; aromatic monomers such as styrene, α-methylstyrene, chlorostyrene, etc.; vinyl cyanide monomers such as acrylonitrile, methacrylonitrile, etc.; acrylic acid esters such as methyl acrylate, ethyl acrylate, butyl acrylate, methyl methacrylate, ethyl methacrylate, butyl methacrylate, etc.; vinyl halides and vinylidene halides such as vinyl chloride, vinyl bromide, vinylidene chloride, vinylidene bromide, etc.; and vinyl esters such as vinyl acetate, vinyl propionate, etc. and these are used singly or as a mixture. When the so-called reactive or cross-linking monomers such as acrylamide, acrylic acid, methacrylic acid, N-methylolacrylamide, etc. are used as a copolymerization component, it goes without saying that the chemical properties and physical properties such as mechanical strength of the film formed from the resulting emulsion are remarkably improved.

As the catalysts used for such copolymerization, there may be used any known radical-generating polymerization catalysts such as persulfates. However, it is particularly preferable to use a redox catalyst composed of the combination of a persulfate and a reducing sulfoxy compound (contingently in combination with ferrous ions) or the combination of a chlorate and a reducing sulfoxy compound.

The aqueous polymer emulsion thus obtained by the method of the present invention is of high concentration, the solid matter concentration being above 15 weight %. Furthermore, an emulsion of a higher concentration can be easily obtained by heat-concentration, without causing any coagulation or precipitation.

For an easier understanding of the present invention, examples are set forth hereunder but the scope of the invention is by no means limited to these examples. All percentages and parts in the examples are by weight unless otherwise indicated.

In the following examples, the measurement of the viscosity and particle diameter and the evaluation of the chemical stability and mechanical stability were conducted as follows:

(I) Viscosity: The viscosity was measured at 25° C. using a B-type viscosimeter, BM-type produced by Tokyo Keiki Seizosho.

(II) Particle diameter: The percent transmission of white light through the emulsion diluted to a concentration of 0.4% solid matter was measured with a spectrophotometer, FPW-4 type produced by Hitachi, Ltd. The particle diameter was roughly calculated from a calibration curve obtained separately which shows the relation between particle diameter and percent transmission.

(III) Chemical stability: Five parts of an aqueous solution of various concentrations of calcium chloride (electrolyte) was added to five parts of the emulsion containing 20% solid matter, and it was observed whether or not any precipitate is generated. The chemical stability is shown by the lowest concentration (expressed by %) of the calcium chloride solutions which brought about precipitation. The greater the numerical value, the better is the chemical stability. When the value is above 50%, it can be judged that the chemical stability is excellent.

(IV) Mechanical stability: One hundred grams of the emulsion was put into a 300 ml beaker and was stirred with a homogenizer at a number of rotation of 7300 r.p.m. for 30 minutes. The weight of the precipitate thus generated was measured, and its percentage based on the weight of the total polymer contained in the sample was obtained. This percentage was taken as the measure of mechanical stability. The smaller this value, the better is the mechanical stability. It was acknowledged that an emulsion having a value less than 0.1% was satisfactory enough for practical use.

EXAMPLE 1

Two hundred and fifty parts of demineralized water and 0.0063 part of ferrous chloride were supplied to a polymerization tank. With the temperature in the tank maintained at 60° C. and under stirring, an aqueous solution composed of 4 parts of sulfopropyl methacrylate (SPMA) and 4 parts of polyethylene glycol (23 mol) monoacrylate (23 M) dissolved in 50 parts of demineralized water, a monomer mixture liquid composed of 52 parts of styrene (St) and 40 parts of butyl acrylate (BuA), 50 parts of a 4% aqueous solution of ammonium persulfate, and 50 parts of a 6.8% aqueous slution of acid sodium sulfite were continuously added dropwise into the polymerization tank from separate supply ports, respectively, to start polymerization. The dropping speed of these monomer and catalyst liquids was adjusted so that the dropping will be completed in 30 minutes. After the termination of the dropping, the polymerization was continued one hour and 30 minutes under the same condition. The aqueous polymer emulsion thus obtained had a solid matter concentration of 20.8%, a pH of 2.5, a viscosity of 7 centipoises and an average particle diameter of 100 mµ. The emulsion was examined for its chemical stability, and was found to have excellent chemical stability which represented a value above 50%. The mechanical stability was also excellent, and no substantial foaming was observed.

On the other hand, the emulsion produced in the same way as above except that 23 M was not used was good in solid matter concentration, pH, viscosity, particle diameter and mechanical stability, but the chemical stability was very poor, being only 3%.

EXAMPLE 2

Following the procedure of Example 1 and varying the kind and amount of monomer as shown in the runs (a) to (d) of Table 1, the polymerization was conducted for two hours for each to produce polymer emulsions. The monomers in the runs (c) and (d) were polymerized in the presence of a specific polymer.

The emulsions thus obtained were measured for the chemical stability, mechanical stability, solid matter concentration, viscosity and particle diameter. The results of measurement are shown in Table 1.

As comparative examples there are shown in the runs (e) to (h) of Table 1, examples in which the polymerization was carried out in accordance with the same operation as above except that the polyoxyethylene units-containing monomers were not used in the runs (a) to (d). The same measurements as above were made for the thus-obtained emulsions. The results are also given in Table 1. As apparent from Table 1, the polymer emulsions not copolymerized with a polyoxyethylene units-containing monomer were chemically very unstable ones which were coagulated by adding a small amount of an electrolyte, whereas the polymer emulsions copolymerized with a specific amount of a polyoxyethylene units-containing monomer by following the method of the present invention have excellent chemical stability while retaining excellent features in solid matter concentration, particle diameter, viscosity and mechanical stability.

TABLE 1

| | Run No. | Amount of use of monomers (parts) | | | | | | 20% WSP (parts) | Polymerization temp. (°C.) | Solid matter conc. (%) | Viscosity (centipoises) | Mechanical stability (%) | Chemical stability (%) | Particle diameter (µ) |
|---|---|---|---|---|---|---|---|---|---|---|---|---|---|---|
| | | St | BuA | MMA | SPMA | 23M | 30M | | | | | | | |
| Present | a | | 80 | 104 | 8 | 8 | | | 40 | 41 | 18 | 0 | 70 | 0.12 |
| in- | b | 46 | 46 | | 4 | | 4 | | 65 | 21 | 5 | 0 | 75 | 0.13 |
| vention | c | | 420 | 530 | 20 | 30 | | 150 | 40 | 41 | 22 | 0 | 65 | 0.12 |
| | d | | 430 | 540 | | | 30 | 150 | 40 | 41 | 11 | 0 | 60 | 0.13 |
| Com- | e | | 88 | 104 | 8 | | | | 40 | 41 | 16 | 0 | 5 | 0.13 |
| parative | f | 48 | 48 | | 4 | | | | 65 | 20 | 4 | 0 | 5 | 0.11 |
| examples | g | | 450 | 530 | 20 | | | 150 | 40 | 41 | 19 | 0 | 5 | 0.12 |
| | h | | 450 | 550 | | | | 150 | 40 | 41 | 20 | 0 | 5 | 0.12 |

Note:
St = Styrene
MMA = Methyl methacrylate
23M = polyethylene glycol (23 mol) monoacrylate monomethacrylate
30M = Polyethylene glycol (30 mol)
WSP = Water-soluble polymer obtained from the copolymerization of methacrylic acid and sodium para-styrenesulfonate in the ratio of 70/30.

EXAMPLE 3

Two kinds of aqueous emulsions (i) and (j), the monomer composition of which were as follows, were produced in accordance with the same procedure as in Example 1 by polymerizing (i) a monomer mixture prepared according to the method of the present invention, and for comparison, (j) a monomer mixture containing 23 M in an amount exceeding the range specified in the method of the present invention.

| | (i) | (j) |
|---|---|---|
| 23M | 20 | 35 |
| SPMA | 4 | 4 |
| BuA | 32 | 27 |
| St | 44 | 34 |

The chemical stability and mechanical stability of the thus-obtained emulsions were excellent, and the solid matter concentration, viscosity and particle diameter were also satisfactory enough.

The two kinds of emulsions (i) and (j) and the Example 1 emulsion prepared by the method of the present invention were spread on a slide glass in a small amount, respectively. They were dried for 24 hours under the condition of 20° C., 65% RH, and further allowed to stand for 3 hours in dry heat at 60° C. The three kinds of films thus produced were tested for the water resistance by causing them to stand in water at 25° C. for 24 hours. The film produced from the emulsion (j) dissolved in water, but the films produced from the emulsion (i) and the Example 1 emulsion represented no change. Thus, it was acknowledged that the films produced from the emulsions of the present invention have good water resistance.

What we claim is:

1. A method of producing an aqueous polymer emulsion with improved stability characterized in that, in producing an emulsifier-free aqueous polymer emulsion, a monomer mixture consisting of a polyoxyethylene-containing vinyl monomer (A) represented by the following general formula (I):

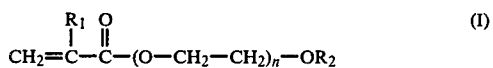
(I)

wherein $R_1$ is H or $CH_3$; $R_2$ is H, $CH_3$ or $C_6H_4-(CH_2)_m-H$;

n is an integer of from 4 to 30; and m is an integer of from 0 to 20, which forms 0.01 to 30 weight % of the total monomer mixture; a vinyl monomer (B) represented by the following general formula (II):

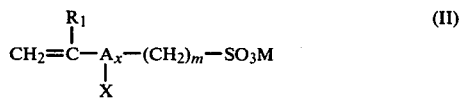
(II)

wherein $R_1$ is H or $CH_3$; X is H or an alkyl group of $C_1-C_4$;

M is H, $NH_4$ or an alkali metal atom; A is a benzene ring;

x is 0 or 1; and m is an integer of from 0 to 4 and at least one other vinyl monomer.

2. A method of producing an aqueous polymer emulsion with improved stability characterized in that, in producing an emulsifier-free aqueous polymer emulsion, a monomer mixture consisting of a polyoxyethylene-containing vinyl monomer (A) represented by the following general formula (I):

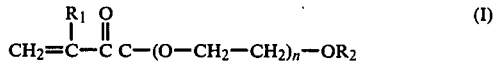
(I)

wherein $R_1$ is H or $CH_3$; $R_2$ is H, $CH_3$ or $C_6H_4-(CH_2)_m-H$;

n is an integer of from 4 to 30; and m is an integer of from 0 to 20;

which forms 0.01 to 30 weight % of the total monomer mixture; a vinyl monomer (B) represented by the following general formula (III):

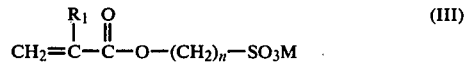
(III)

wherein $R_1$ is H or $CH_3$; M is H, $NH_4$ or an alkali metal atom;

and n represents an integer of from 1 to 4 and at least one other vinyl monomer.

3. A method according to claim 1 wherein the ratio of use of the vinyl monomer represented by the general formula (II) is 0.1-15 weight % based on the total amount of the whole monomer mixture.

4. A method according to claim 2 wherein the ratio of use of the vinyl monomer represented by the general formula (III) is 0.1-15 weight % based on the total amount of the whole monomer mixture.

* * * * *